US011938576B1

(12) United States Patent
Bullockus et al.

(10) Patent No.: US 11,938,576 B1
(45) Date of Patent: Mar. 26, 2024

(54) SYSTEMS AND METHODS FOR THREADING A TORQUE TUBE THROUGH U-BOLT AND MODULE RAIL DEVICES

(71) Applicant: Terabase Energy, Inc., Berkeley, CA (US)

(72) Inventors: Jennifer June Bullockus, Davis, CA (US); Dylan Harper, Vancouver, WA (US); Johann Fritz Karkheck, Petaluma, CA (US); Adam Hansel, Davis, CA (US)

(73) Assignee: Terabase Energy, Inc., Berkeley, CA (US)

( * ) Notice: Subject to any disclaimer, the term of this patent is extended or adjusted under 35 U.S.C. 154(b) by 0 days.

(21) Appl. No.: 18/084,987

(22) Filed: Dec. 20, 2022

(51) Int. Cl.
*B23P 19/04* (2006.01)
*B23P 19/12* (2006.01)
*B23P 21/00* (2006.01)
*H02S 20/32* (2014.01)

(52) U.S. Cl.
CPC ............... *B23P 19/04* (2013.01); *B23P 19/12* (2013.01); *B23P 21/00* (2013.01); *H02S 20/32* (2014.12)

(58) Field of Classification Search
CPC .......... B23P 19/04; B23P 19/10; B23P 19/12; B23P 21/00; Y10T 29/49355; Y10T 29/49838; H02S 20/00–32; F24S 25/30; F24S 2025/6003; F24S 2025/6005; F24S 2025/6006; F24S 25/634–636; Y02E 10/50; F16B 5/0685
See application file for complete search history.

(56) References Cited

U.S. PATENT DOCUMENTS

| | | | |
|---|---|---|---|
| 4,042,004 | A | 8/1977 | Kwan |
| 7,012,188 | B2 | 3/2006 | Erling |
| 7,105,940 | B2 | 9/2006 | Weesner et al. |
| 8,584,338 | B2 | 11/2013 | Potter |
| 8,650,812 | B2 | 2/2014 | Cusson |
| 9,827,678 | B1 | 11/2017 | Gilbertson et al. |
| 10,232,505 | B2 | 3/2019 | Tadayon |
| 11,228,275 | B2 | 1/2022 | Miller et al. |
| 11,241,799 | B2 | 2/2022 | Clemenzi et al. |

(Continued)

FOREIGN PATENT DOCUMENTS

| | | |
|---|---|---|
| CN | 103324204 B | 11/2012 |
| CN | 104102227 B | 7/2017 |

(Continued)

OTHER PUBLICATIONS

Restriction requirement dated Sep. 22, 2023 in related U.S. Appl. No. 17/390,159, (7 pgs).

(Continued)

*Primary Examiner* — Matthew P Travers
(74) *Attorney, Agent, or Firm* — North Weber & Baugh LLP; Michael North (57) ABSTRACT

A system and method for threading a torque tube through an opening within a U-bolt and module rail device is described. The system and method provide aligned horizontal movement of the torque tube across an assembly frame resulting in the torque tube being threaded through a plurality of U-bolt and module rail devices. After the threading process is complete, the threaded U-bolt and module rail devices are secured in place on the torque tube to allow coupling of solar panels to the module rails.

12 Claims, 12 Drawing Sheets

(56) References Cited

U.S. PATENT DOCUMENTS

| | | |
|---|---|---|
| 11,245,353 B2 | 2/2022 | Di Stefano et al. |
| 11,502,638 B2 | 11/2022 | Watson et al. |
| 11,770,099 B2 | 9/2023 | Carter |
| 2006/0201987 A1 | 9/2006 | Brown |
| 2008/0260500 A1 | 10/2008 | Meulen |
| 2010/0000592 A1 | 1/2010 | Ko |
| 2011/0284709 A1 | 11/2011 | Potter |
| 2012/0027550 A1 | 2/2012 | Bellacicco et al. |
| 2012/0085395 A1 | 4/2012 | Kuster et al. |
| 2012/0279069 A1 | 11/2012 | Von Deylen |
| 2013/0153007 A1 | 6/2013 | Plesniak |
| 2013/0340807 A1 | 12/2013 | Gerwing et al. |
| 2014/0025343 A1 | 1/2014 | Gregg et al. |
| 2014/0143061 A1 | 5/2014 | Abyanker |
| 2014/0246549 A1* | 9/2014 | West .................. H02S 20/23 248/220.22 |
| 2015/0066442 A1 | 3/2015 | Pryor |
| 2015/0069001 A1 | 3/2015 | French et al. |
| 2016/0014283 A1 | 1/2016 | Nakano et al. |
| 2016/0129595 A1 | 5/2016 | Gerio et al. |
| 2016/0285412 A1 | 9/2016 | French |
| 2019/0280641 A1 | 9/2019 | Owen |
| 2019/0341878 A1* | 11/2019 | Watson ................ F24S 30/425 |
| 2019/0367014 A1 | 12/2019 | Woodley |
| 2020/0076358 A1* | 3/2020 | Au ...................... F16B 5/0607 |
| 2021/0041145 A1 | 2/2021 | Dally |
| 2021/0205997 A1 | 7/2021 | Zhou et al. |
| 2021/0206003 A1 | 7/2021 | Zhou et al. |
| 2021/0234504 A1 | 7/2021 | Meller et al. |
| 2021/0293455 A1 | 9/2021 | Au |
| 2021/0379757 A1 | 12/2021 | Schneider et al. |
| 2022/0034426 A1 | 2/2022 | Clapper et al. |
| 2022/0234516 A1 | 7/2022 | Prentice et al. |
| 2023/0163720 A1 | 5/2023 | Di Stefano et al. |

FOREIGN PATENT DOCUMENTS

| | | |
|---|---|---|
| CN | 209707983 U | 11/2019 |
| CN | 219535977 U | 8/2023 |
| GB | 734098 | 7/1955 |
| KR | 101019430 B1 | 9/2008 |
| KR | 20110031053 A | 9/2009 |
| WO | 2011117485 A1 | 9/2011 |
| WO | 2013064624 A1 | 5/2013 |
| WO | WO 2015190901 A1 | 12/2015 |
| WO | WO 2018138033 A1 | 8/2018 |
| WO | WO 2021119733 A1 | 6/2021 |
| WO | 2021229387 A2 | 11/2021 |
| WO | WO 2022112921 A1 | 6/2022 |
| WO | WO 2023079377 A1 | 5/2023 |

OTHER PUBLICATIONS

International search report and written opinion of the international searching authority dated Dec. 16, 2022 in related PCT application No. PCT/US22/38288, (11 pgs).

International Search Report and Written Opinion of the International Searching Authority dated Dec. 13, 2022 in related PCT application No. PCT/US22/42396, (9 pgs).

International Search Report and Written Opinion of the International Searching Authority dated May 1, 2023 in related PCT application No. PCT/US23/11125, (9 pgs).

International search report and written opinion of the international searching authority dated Nov. 20, 2023 in related PCT application No. PCT/US2023/029584, (7 pgs).

Response to Restriction requirement filed Nov. 21, 2023 in related U.S. Appl. No. 17/390,159, (7 pgs).

Non-final office action dated Dec. 20, 2023 in related U.S. Appl. No. 17/464,178, (23 pgs).

International search report and written opinion of the international searching authority dated Dec. 21, 2023 in related PCT application No. PCT/US2023/029583, (14 pgs).

Non-final office action dated Jan. 18, 2024 in related U.S. Appl. No. 17/390,159, (33 pgs).

* cited by examiner

SYSTEMS AND METHODS FOR THREADING A TORQUE TUBE THROUGH U-BOLT AND MODULE RAIL DEVICES

TECHNICAL FIELD

The present disclosure relates generally to coupling a plurality of U-bolt and module rail devices to a torque tube within a centralized assembly factory. More particularly, the present disclosure relates to automated or partially automated systems and methods for coupling the plurality of U-bolts and module rails to the torque tube by a motorized guide element that facilitates threading of the torque tube through an opening in each of the U-bolt and module rail devices.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently assemble components, such as solar tables, during the process of building large-scale solar panel systems.

Large-scale solar panel systems typically include thousands of solar panels that are located across a multi-acre terrain and that are electrically coupled to provide a source of energy. These large-scale systems are oftentimes located in remote areas and require a significant investment in materials, resources and labor in their installation and design. The sourcing and delivery of materials and resources for these installations can be problematic and inconsistent. A further complication is the reliable and safe movement of these materials and resources across large areas of the construction site as well as maintaining consistent installation processes at each point of installation within the site. These issues further contribute to an increase in the cost and complexity of what is already a very cost-sensitive process.

Figure 1:
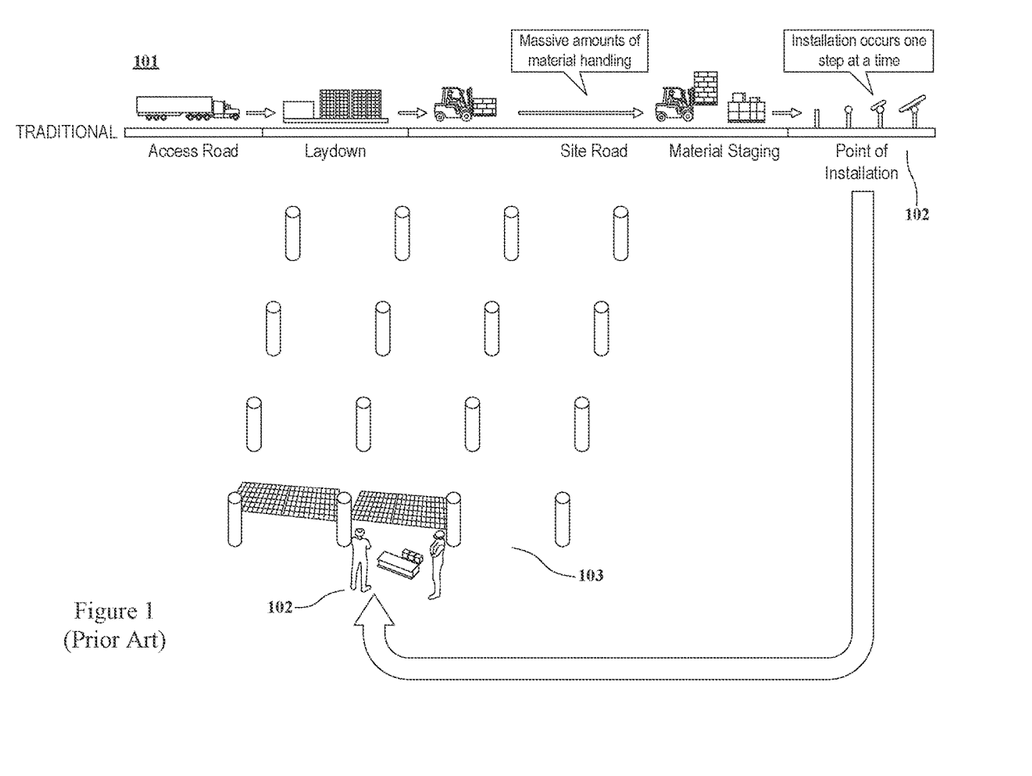
FIG. 1 shows a prior art assembly and installation process of large-scale solar panel systems.

FIG. 1 illustrates a typical prior-art installation process for solar systems. This prior-art installation process is implemented such that all mounting equipment for each solar panel is individually assembled and installed at its location within the larger system. The cost-effectiveness of this approach works fine within smaller solar deployments but struggles to cost-effectively scale to large solar systems as described below.

This traditional deployment 101 relies on materials being delivered to a deployment site via an access road. The materials are then processed and staged at the deployment site by a crew. A small portion of this delivered material is then moved by heavy equipment to a specific location where a solar table and mounting equipment are assembled and installed at that location 102. The step is then repeated for an adjacent location 103 where materials are subsequently delivered, assembled and installed for a neighboring solar table within the system. While this approach may be effectively deployed in the installation of smaller solar systems, it becomes cost prohibitive as the size of the system increases.

What is needed are systems, devices and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including various processes, apparatuses, systems, devices, or methods.

Components, devices and systems shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of a solar table assembly location.

Furthermore, structures and functions associated with components or systems within the figures are not intended to be limited to those specifically illustrated and/or described. Rather, these components may be modified, re-formatted, or otherwise changed in a variety of ways consistent with the understanding of one of skill in the art. Also, components may be integrated together or be discrete within the context of a solar panel assembly location.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different solar table assembly location; and (4) certain functions may be performed concurrently or in sequence.

In this document, "large-scale solar system" refers to a solar system having 1000 or more solar panels. The word "resources" refers to material, parts, components, equipment or any other items used to construct a solar table and/or solar system. The word "personnel" refers to any laborer, worker, designer or individual employed to construct or install a solar table or solar system. The term "solar table" refers to a structural assembly comprising a torque tube and/or purlins with module rails. Some types of solar tables may have supplemental structure that allows it to connect to foundations/piles while other types do not have this supplemental structure. A solar table may have (but is not required) solar panels and/or electrical harnesses. The term "U-bolt" refers to a securing element that wraps around or partially wraps around a torque tube to which a module rail or a solar panel may be coupled. The term "module rail" refers to a component that couples to a U-bolt and provides a surface to which a solar panel (including a rail of the solar panel) may be coupled. The term "U-bolt and module rail device" refers to a device comprising a U-bolt and a module rail. In some examples, a U-bolt and module rail device comprises discrete U-bolt and a module rail components that allow tightening of the U-bolt around the torque tube and a securing surface that allows the solar panel to be coupled to the module rail component. In other examples, a U-bolt and module rail device is a single integrated device in which a flexible bracket is provided that wraps around a torque tube and is tightened by a bolt that effectively causes the flexible bracket to tighten around the torque tube while also providing a surface to which a solar panel may be coupled. The term "guide element" is a motorized or partially motorized support that guides a torque tube through an opening in a U-bolt or U-bolt and module rail device. One example of a guide element is a motorized roller.

Figure 2:
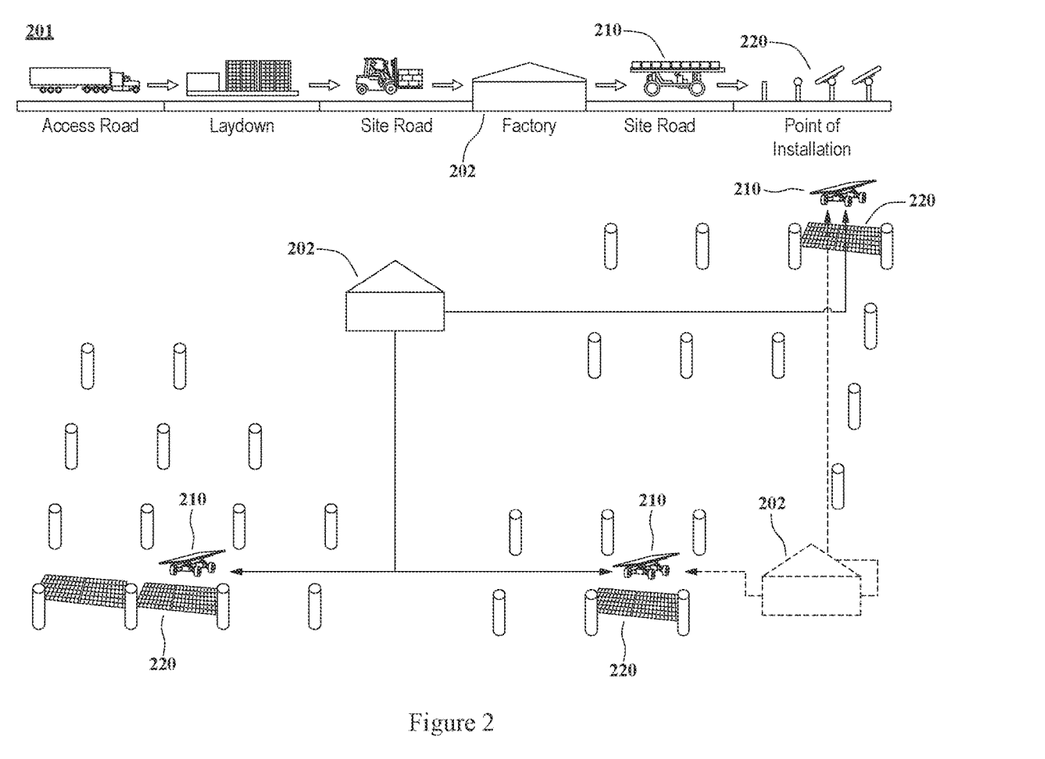
FIG. 2 is a diagram showing a centralized assembly and installation of a solar system including mobile transport of solar tables in accordance with various embodiments of the invention.

FIG. 2 provides an overview of a centralized solar table assembly and installation for large-scale solar systems according to various embodiments of the invention. Embodiments of the invention transition the prior art approach of assembly and installation at single location sites to a centralized and coordinated assembly factory that allows a more cost-effective and dynamic process of constructing large-scale solar systems. This centralized assembly of solar system components, such as solar tables, necessitates processes within the centralized assembly factory that emphasizes more efficient assembly procedures to construct these components. For example, the construction of a solar table requires that a torque tube be properly positioned within an assembly framework so that solar panels may be secured to the torque tube. This procedure requires that securing elements, such as U-bolts and module rail devices, are coupled onto the torque tube to allow the solar panels to be secured thereon. Automating or partially automating some of these processes within a central assembly frame allows the component construction process to scale and results in higher output of the assembled components for subsequent delivery to installation sites within a solar system.

As shown in this FIG. 2, resources are brought to a construction site 201 for a large-scale solar system and initially processed. These resources are delivered to one or more assembly factories 202 where a coordinated and centralized solar table assembly process is performed. In certain embodiments, a construction site may have multiple centralized factories 202. As shown in FIG. 2, there are two centralized factories 202 strategically located at the site. The location and number of centralized factories 202 may depend on several parameters including the size of the site, the terrain of the site, the design of the site and other variables that relate to the construction of the large-scale solar system.

Assembled solar tables and equipment are moved from a factory 202 to an installation site 220 via motorized vehicles 210 such as a mobile transport. In certain embodiments, the factory 202 comprises an assembly frame on which a solar table is constructed and a solar panel loader that moves the assembled solar panel to a mobile transport for delivery to the installation site 220.

Figure 3:
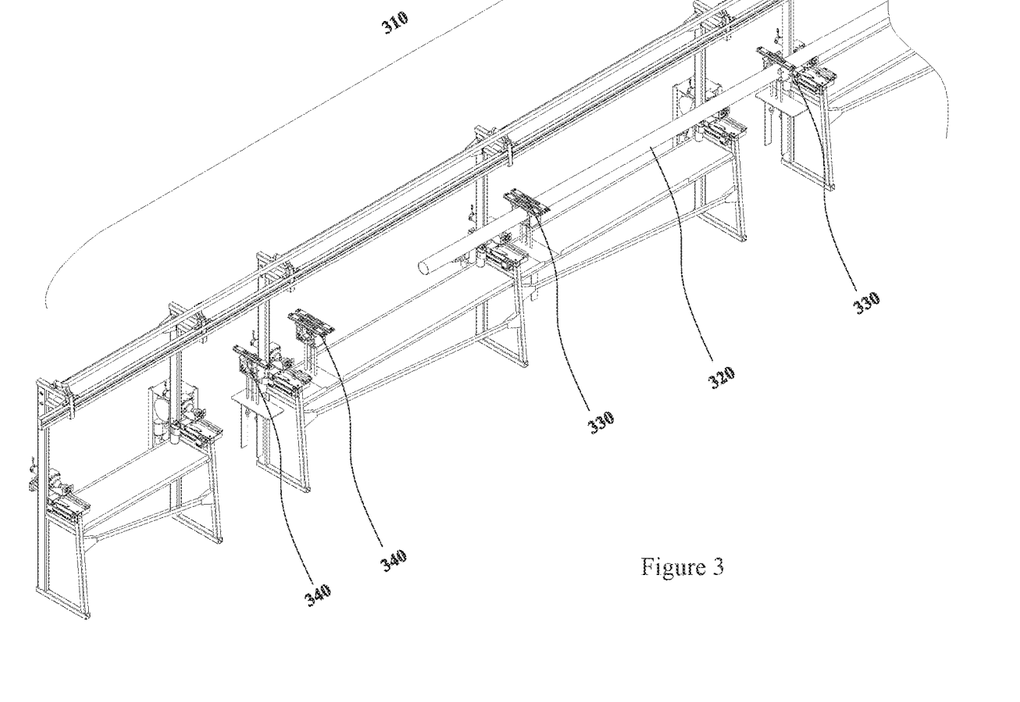
FIG. 3 is an illustration of a solar table assembly location comprising a torque tube within an assembly frame and having been partially threaded through a plurality of U-bolt and module rail devices according to various embodiments of the invention.

FIG. 3 illustrates an assembly frame in which a torque tube is partially threaded through a plurality of U-bolt and module rail devices according to various embodiments of the invention. The assembly frame 310 enables a large number of solar tables to be constructed at a single location and subsequently transported and installed at installation points within a large-scale solar system. As described above, this centralized assembly of solar tables increases the efficiency and lowers the cost of constructing these large-scale solar systems. The process of constructing these solar tables requires that torque tubes be fitted with a plurality of U-bolt and module rail devices that enable multiple solar panels to be subsequently coupled to the torque tube resulting in an assembled solar table. In various embodiments, the assembly frame 310 provides a motorized or partially motorized process that threads a torque tube 320 through a plurality of U-bolt and module rail devices 330, 340 after which the devices are secured to the torque tube 320.

As shown in FIG. 3, a torque tube 320 is in the process of being threaded through U-bolt and module rail devices such that the torque tube has been threaded through a first set of U-bolt and module rail devices 330 and is aligned to a second set of U-bolt and module rails devices 340 for subsequent threading processes in accordance with various embodiments of the invention. One skilled in the art will recognize that the torque tube 320 may be threaded through the U-bolt and module rail devices 330 with the swagged end leading or the swagged end at the back. The assembly frame 310 provides support structures that position a plurality of U-bolt and module rail devices 330, 340 at locations along a line and within the frame 310. In certain embodiments, each of the U-bolt and module rail devices 330, 340 is supported by a detachable bracket that is coupled to a motor, such as an actuator or a four-bar linkage motor, that positions the device proximate to a guide element, such as a motorized roller (described below). For example, the motor may provide vertical motion, or a combination of vertical, horizontal and/or rotational motion, of the bracket supporting a U-bolt and module rail device to move it in a preferred position that is aligned to other such devices within the assembly frame 310 so that a torque tube threading process may occur. One skilled in the art will recognize that the U-bolt and module rail device may be positioned in an upright position, an upside down position, or any position therebetween. In various embodiments, the threading process is a motorized process in which a torque tube is horizontally moved across the assembly frame 310 and threaded through each of the U-bolt and module rail devices.

Figure 4:
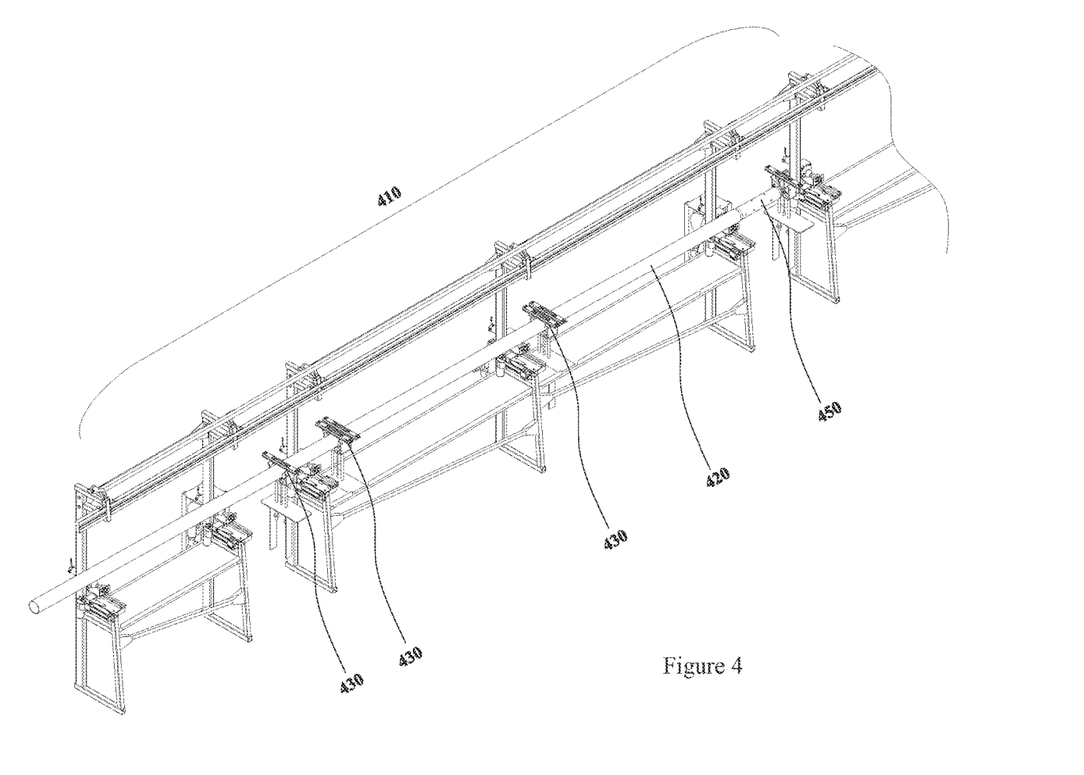
FIG. 4 is an illustration of a solar table assembly location comprising a torque tube within an assembly frame and having been fully threaded through a plurality of U-bolt and module rail devices according to various embodiments of the invention.

FIG. 4 illustrates an assembly frame in which a torque tube is fully threaded through a plurality of U-bolt and module rail devices according to various embodiments of the invention. As shown, an assembly frame 410 is supporting a torque tube 420 that has completed a threading process through a plurality of U-bolt and module rail devices 430. Each bracket holding a U-bolt and module rail device 430 is moved away from the device either prior to or after the device 430 is tightened around the torque tube 420. In certain embodiments, each of the U-bolt and module rail devices 430 is tightened around the torque tube 420 such that minimal or no movement occurs. After this securing process, solar panels are coupled to the devices 430. Thereafter, the assembled solar table may be coupled within a solar system at a remote installation site by inserting a swaged end 450 of the torque tube 420 into an end of previously installed solar table. In certain examples, bolts are used to secure the two torque tubes together.

Figure 5:
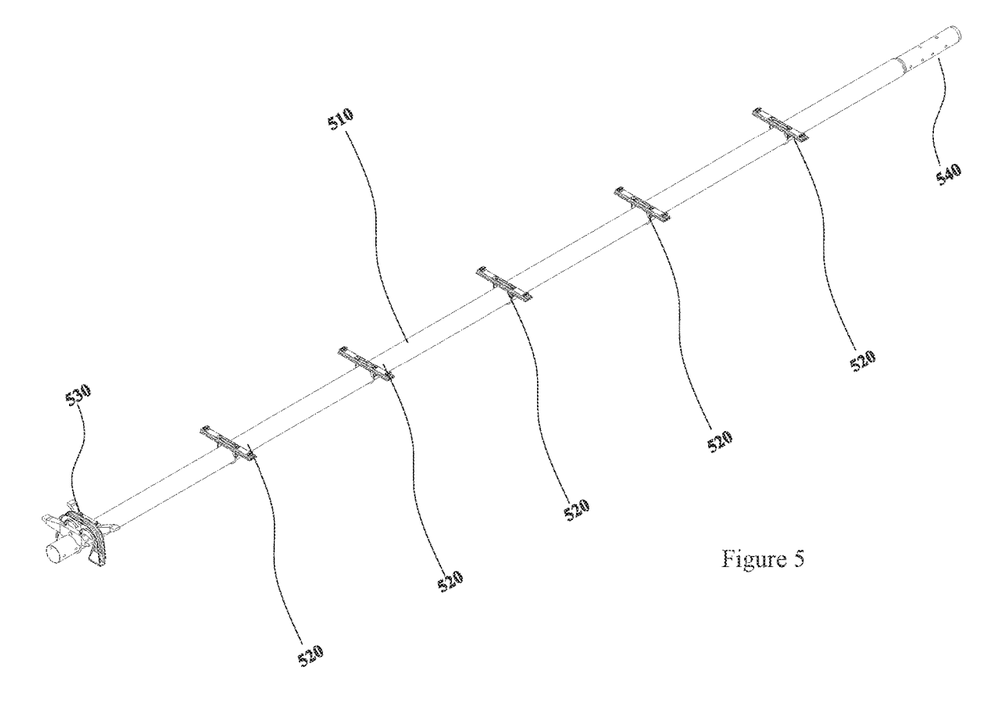
FIG. 5 is an illustration of a torque tube that is coupled to a plurality of U-bolt and module rail device after a threading process within an assembly frame according to various embodiments of the invention.

FIG. 5 illustrates a torque tube after a plurality of secured U-bolt and module rail devices according to various embodiments of the invention. As shown, each of U-bolt and module rail devices 520 are positioned and secured at preferred positions along a torque tube 510. In certain embodiments, solar panels may be coupled to the torque tube 510 using bolts that couple a U-bolt and module rail device 520 to a solar panel rail. After the solar panels are coupled to the torque tube 510, the solar table has been assembled or partially assembled and ready for integration into the solar system at an installation site. In certain embodiments, the torque tube comprises a swaged end 540 may be inserted into another torque tube and a bearing housing assembly 530 that couples to a mount or support structure within the solar system.

Figure 6:
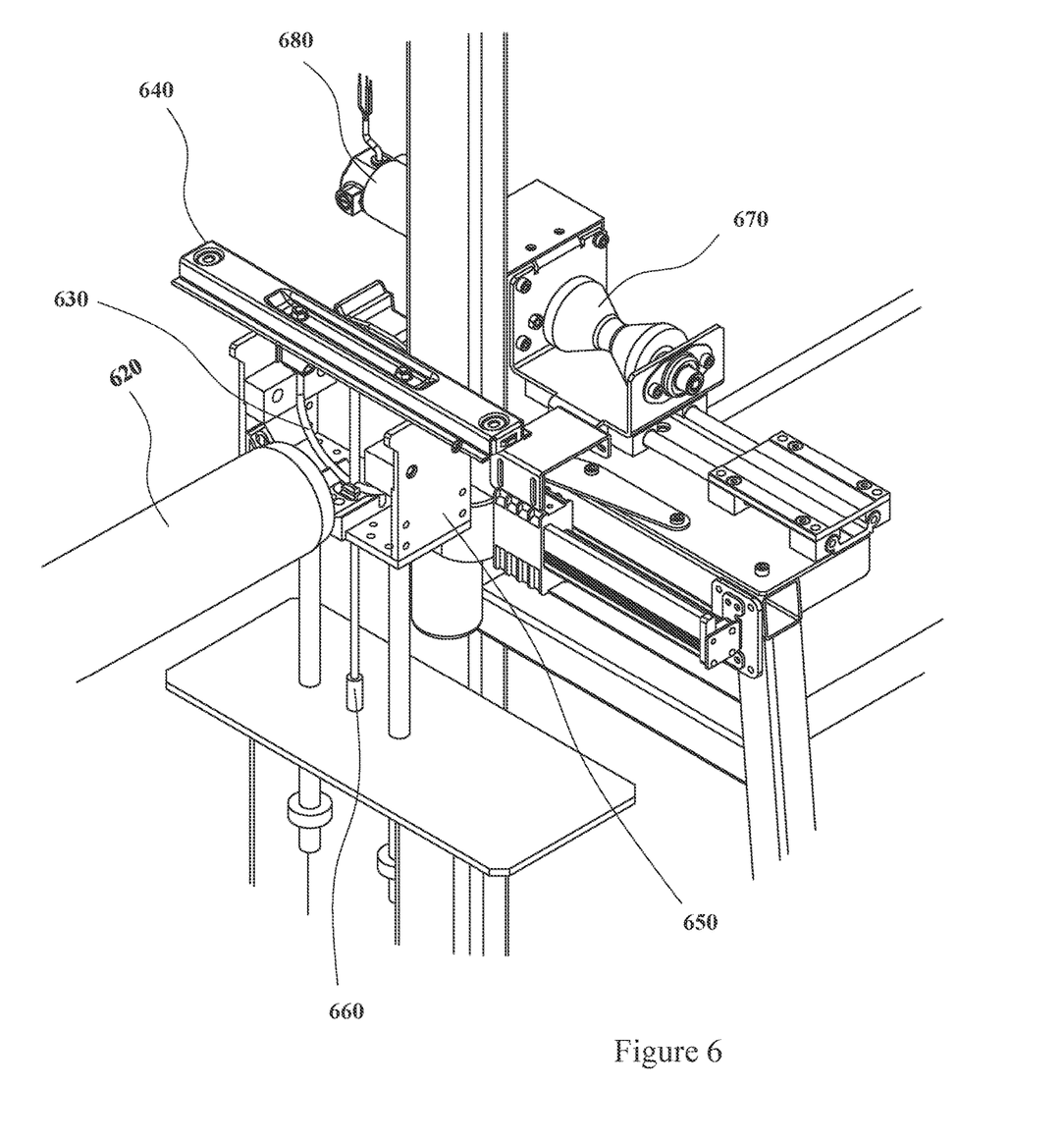
FIG. 6 is a focused illustration of a torque tube being threaded through a U-bolt and module rail device using a motorized torque tube roller according to various embodiments of the invention.

FIG. 6 illustrates a close-up view of a threading process being performed according to various embodiments of the invention. In this example, a torque tube is about to be threaded through a U-bolt and module rail device comprising a U-bolt 630 and a module rail 640. The U-bolt and module rail device is being supported in position by a bracket 650 that is coupled to a motor 660 that moves the bracket 650 and corresponding U-bolt and module rail device in position for the threading process. In certain embodiments, the motor 660 is an actuator that provides vertical motion to the bracket 650. A guide element is positioned proximate to the U-bolt and module rail device to guide the torque tube 620 through an opening of the U-bolt 630. In certain embodiments, the guide element is a motorized roller 670 that has a motor 680 that rotates the roller 670 to provide horizontal movement of the torque tube during the threading process. One skilled in the art will recognize that the guide element may be located behind the U-bolt and module rail device (as shown) or in front of the device. One skilled in the art will also recognized that multiple guide elements may be located proximate to a U-bolt and module rail device in various embodiments of the invention.

In this particular example, the U-bolt and module rail device is supported by the bracket 650. The bracket 650 has been moved into a preferred position for threading the torque tube by the motor 660 via vertical movement of the bracket 650 (and U-bolt and module rail device) into the preferred position that is in line with other U-bolt and module rail devices through which the torque tube 620 will be or has been threaded. This alignment process is performed by multiple guide elements that support the torque tube 620. As previously stated, the guide elements in this example are motorized rollers that not only align horizontal motion of the torque tube 620 but also applies a horizontal force that moves the torque tube 620 through the opening(s) of the U-bolt and module rail device(s).

Once the torque tube 620 has been threaded through the U-bolt and module rail device, the motor 660 lowers the bracket 650 from the U-bolt and module rail device. As a result, the U-bolt and module device is hanging from the torque tube 620 after the threading process has occurred. Thereafter, the U-bolt and module rail device may be secured in place around the torque tube 620 by tightening bolts or other methods of securing the device around the tube.

One skilled in the art that the positions of a U-bolt and module rail device, a motor moving the position of the bracket holding the U-bolt and module rail device, and one or more guide elements may vary across different embodiments of the invention. In addition, other devices may also be used to further enhance the threading process by improving alignment of a torque tube and opening within a U-bolt or U-bolt and module rail device, improving horizontal movement of the torque tube or tightening of the U-bolt or U-bolt and module rail device after a threading process has occurred.

Figure 7A:
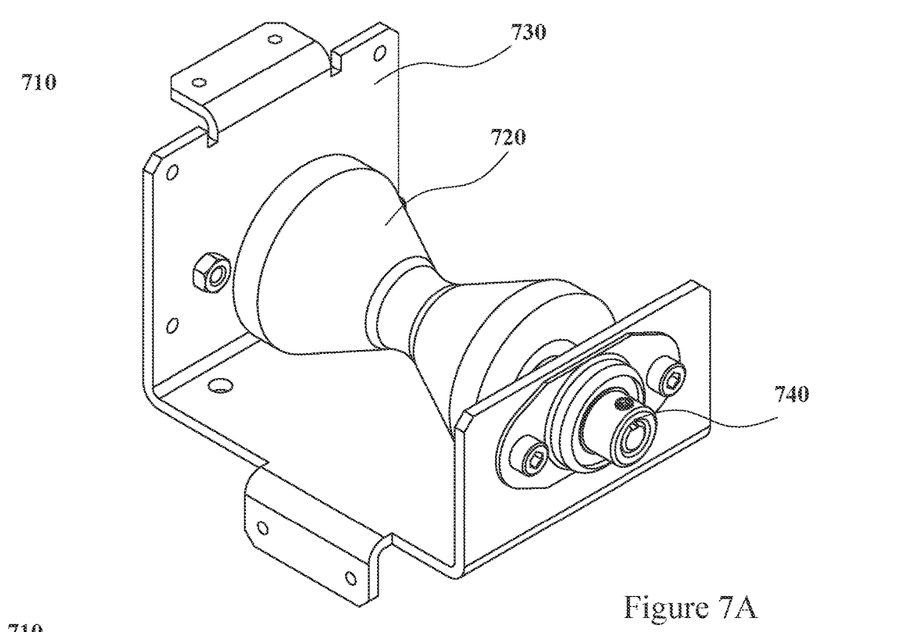
FIG. 7A is a first perspective view of a motorized torque tube roller according to various embodiments of the invention.
Figure 7B:
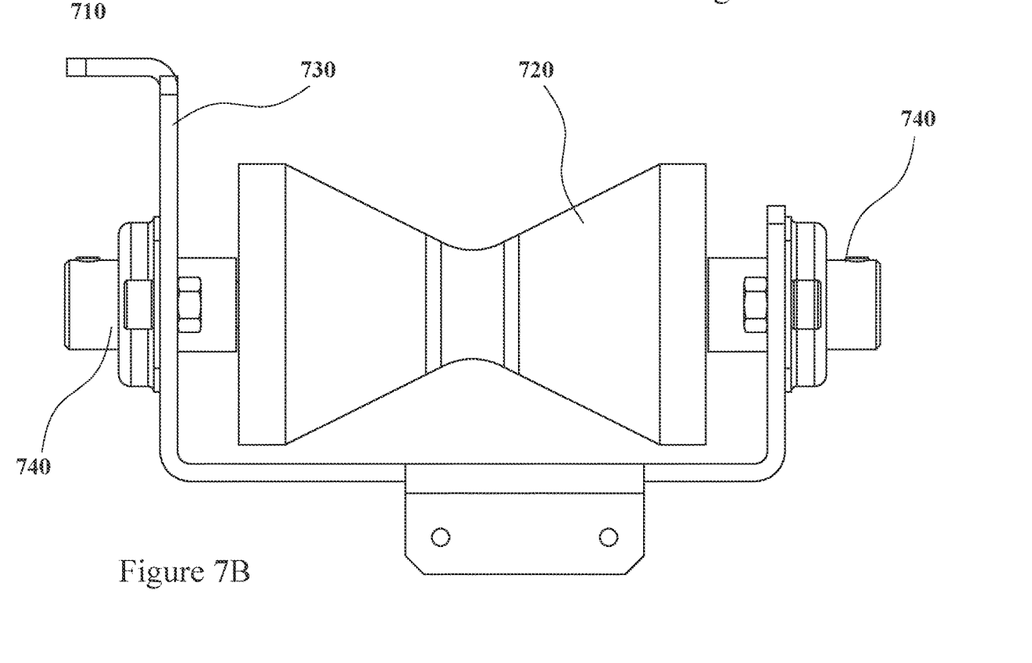
FIG. 7B is a second perspective view of a motorized torque tube roller according to various embodiments of the invention.

FIGS. 7A and 7B provide different perspectives of a motorized roller (one example of a guide element) in accordance with various embodiments of the invention. A guide element provides aligned horizontal movement of a torque tube relative to an opening of a U-bolt or U-bolt and module rail device to facilitate a threading process. In this particular example, the motorized roller 710 comprises a roller element 720, a roller housing 730 and a motor interface 740 that provide the guided horizontal movement of a torque tube during a threading process. The roller element 720 is shaped such that the torque tube is centered within the roller itself. The surface of the roller element 720 provides sufficient friction that the torque tube moves horizontally as the roller element 720 spins. A motor coupled to the motor interface 740 provides power to spin the roller element 720. The roller housing 730 secures the motorized roller 710 in a location proximate to other devices implemented in a threading process. As described above, the motorized roller 710 may be located in any position to facilitate the guided horizontal movement of the torque tube and may be a single guide element associated with a U-bolt or U-bolt and module rail device or may be implemented with multiple guide elements.

One skilled in the art will recognize that a guide element may be implemented in a variety of different structures that provide the function of guided horizontal movement of a torque tube relative to an opening of a U-bolt or U-bolt and module rail device.

Figure 8:
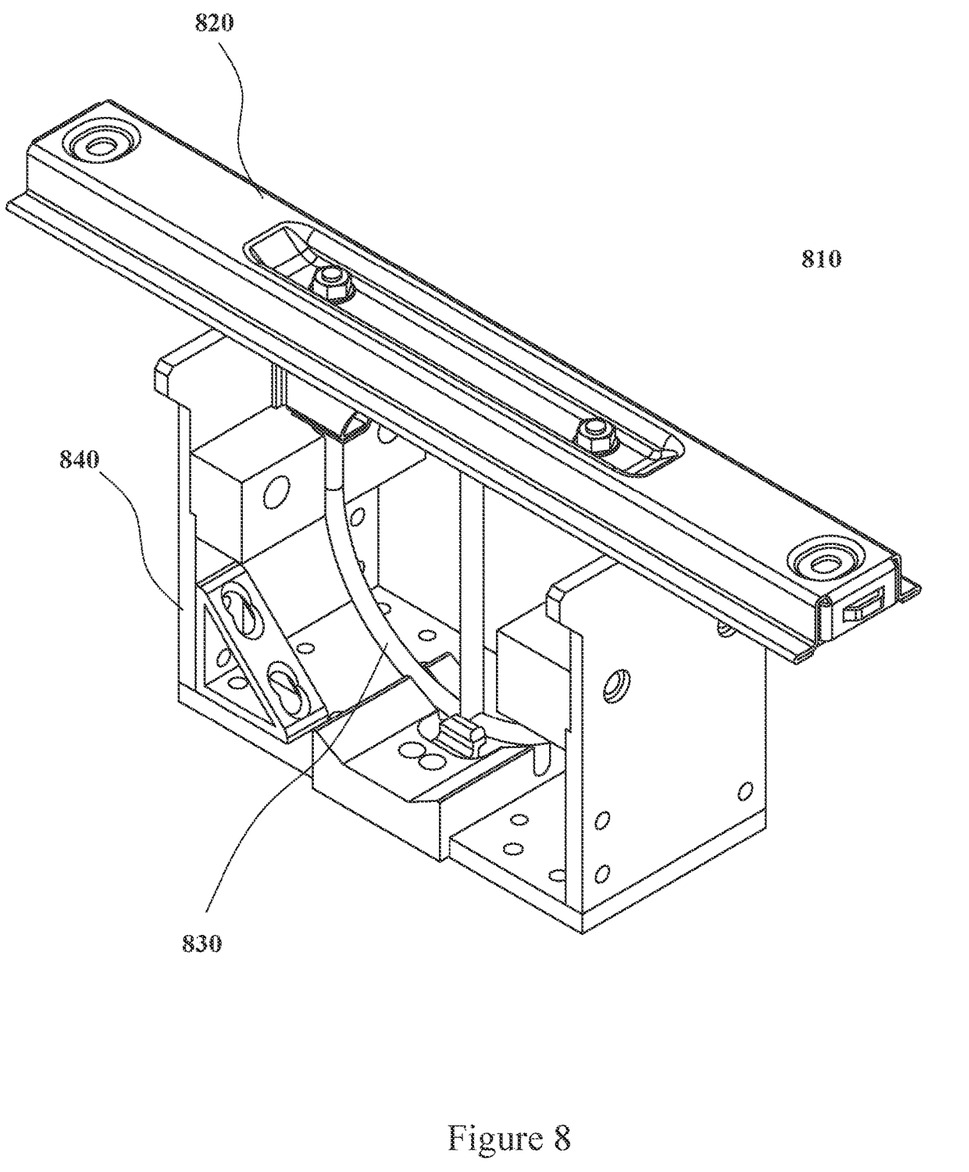
FIG. 8 is an illustration of a U-bolt and module rail device comprising a single U-bolt and module rail and corresponding bracket according to various embodiments of the invention.

FIG. 8 is an illustration of a U-bolt and module rail device within a bracket according to various embodiments of the invention. In this example, a single U-bolt 830 and a single module rail 820 is implemented within the device 810. An opening is created in the device 810 by the top of a U-bolt 830 being coupled to the module rail 820. The torque tube is moved through this opening during a threading process after which bolts on the module rail 820 are tightened to secure the device 810 around the torque tube.

The bracket 840 supports the U-bolt and module rail device prior to and during the threading process. In this particular example, the bracket 840 comprises a groove in which the U-bolt 830 resides and top surfaces that support the module rail 820. This groove and top surfaces hold the device 810 in place during a threading process but are also structured to release the device 810 if a force is applied to the device 810 that exceeds a threshold. For example, if the torque tube is misaligned to the opening and begins to press up against a structural component of the device 810 or bracket 840, then the bracket 840 and device 810 will decouple resulting in the device falling away from the torque tube without being damaged. The torque tube will be able to move horizontally without damaging anything and will allow personnel to stop the motorized threading process.

As previously described, the bracket 840 may be controlled by a motor that results in vertical movement of the bracket 840. This movement allows the motor to position the bracket 840 and device 810 in a first position in anticipation of a threading process. After a threading process is complete, the motor lowers the bracket 840 resulting in a de-coupling of the bracket 840 from the U-bolt and module rail device 810.

Figure 9:
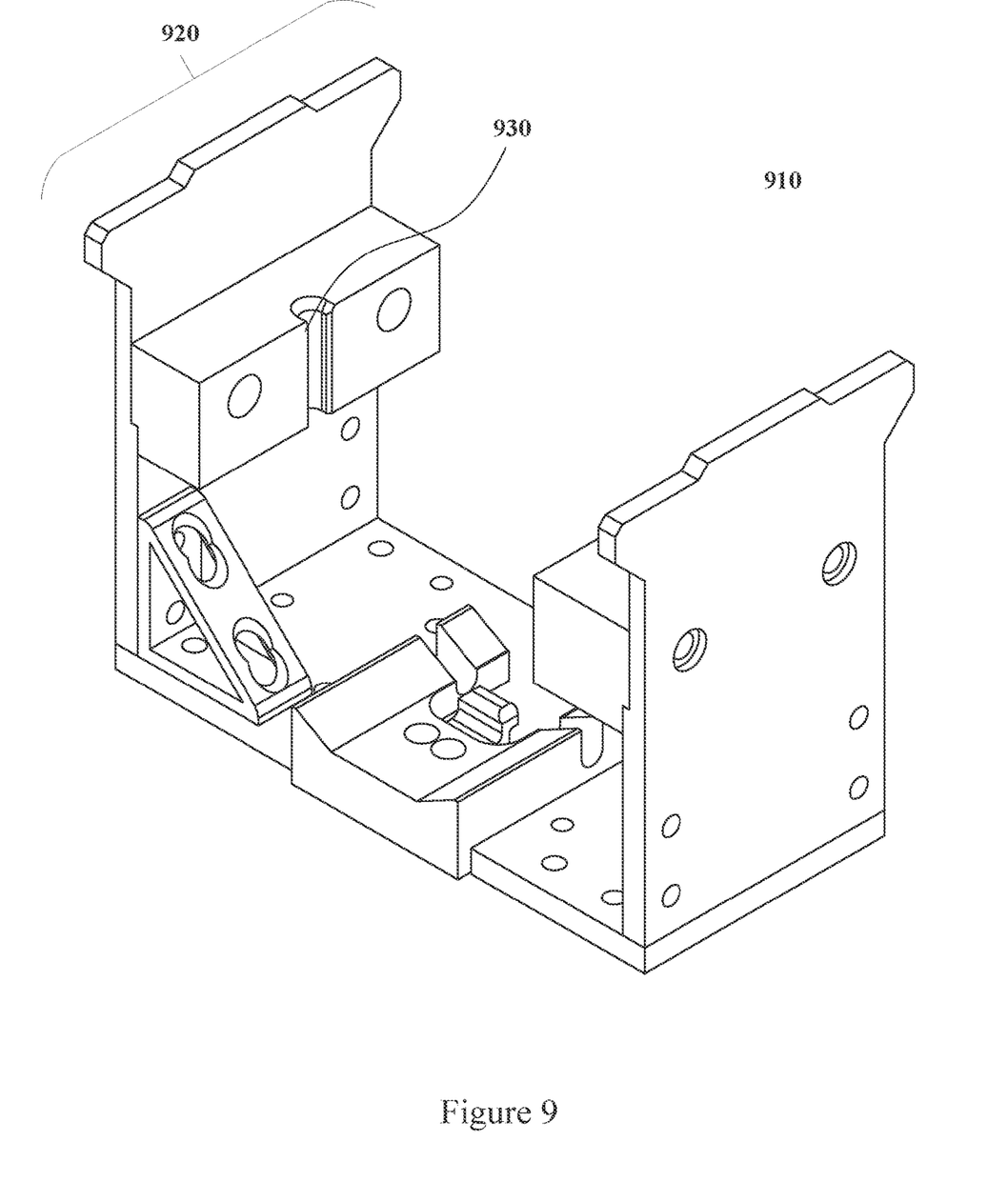
FIG. 9 is an illustration of a bracket that supports a U-bolt and module rail device comprising a single U-bolt and module rail according to various embodiments of the invention.

FIG. 9 is an illustration of a bracket in accordance with various embodiments of the invention. In this example, the bracket 910 comprises a groove 930 in which a U-bolt resides and a top surface 920 on which a module rail rests. The groove 930 supports the U-bolt and allows positioning of the U-bolt in a preferred location as well as facilitating de-coupling of the U-bolt from the bracket 910 when the bracket 910 is lowered or when a sufficiently large horizontal force is applied when a misaligned torque tube presses up against the bracket 910 and/or U-bolt and module rail device.

The top surface 920 is shaped so that a module rail rests thereupon prior to and during a threading process. However, if the torque tube isn't properly aligned to an opening of the device, then the torque tube may apply a force upon the bracket 910 and/or module rail as it horizontally moves and collides with one of these structures. In such a misalignment event, the U-bolt and module rail device will decouple from the device to allow further horizontal movement of the torque tube to reduce further damage. In this particular example, the top surface 920 comprises a raised ridge that holds the module rail in place but also allows the module rail to release if sufficient horizontal force is applied. One skilled in the art will recognize that a variety of different structures within a bracket may be implemented to hold a U-bolt and a module rail in place during a threading process and also facilitate a de-coupling of the device from the bracket in the event of a misalignment.

Figure 10:
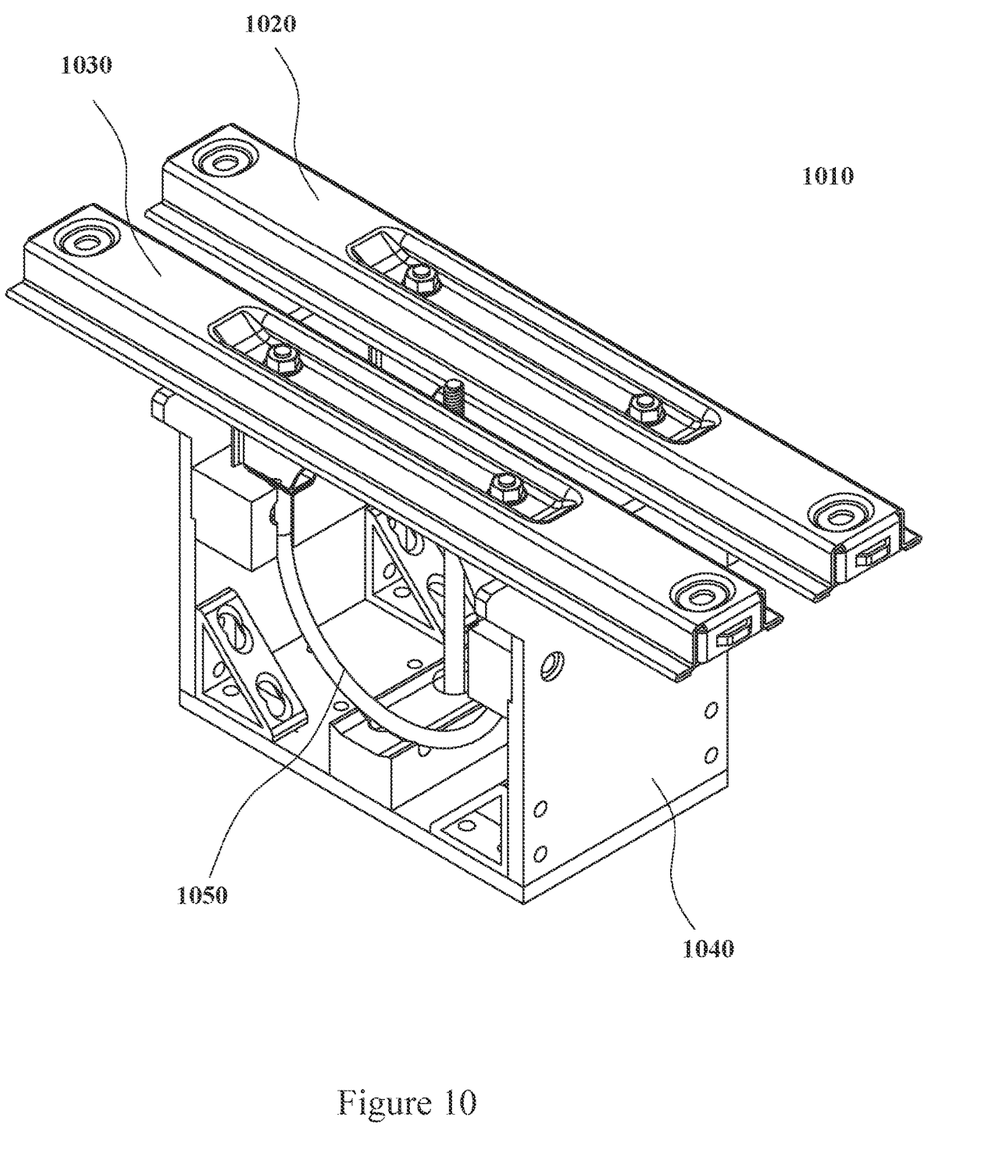
FIG. 10 is an illustration of a U-bolt and module rail device comprising two U-bolts and module rails and corresponding bracket according to various embodiments of the invention.

FIG. 10 illustrates another U-bolt and module rail device according to various embodiments of the invention. In this example, the device 1010 comprises two U-bolts and two module rails that may be threaded by a torque tube. A bracket 1040 supports a first U-bolt 1050 coupled to a first module rail 1030 and a second U-bolt (not shown) coupled to a second module rail 1020. The threading process in this particular embodiment functions in a similar manner as described above in that the bracket 1040 is coupled to a motor that provides vertical movement and the bracket is structurally designed to decouple from the device 1010 if a horizontal force is applied to the device 1010 and/or bracket 1040 above a threshold as a result of misalignment of the torque tube.

The implementation of multiple U-bolts and module rails within a U-bolt and module rail device 1010 provides additional surfaces and bolts to which solar panels may be coupled to the torque tube using the multiple module rails.

Figure 11:
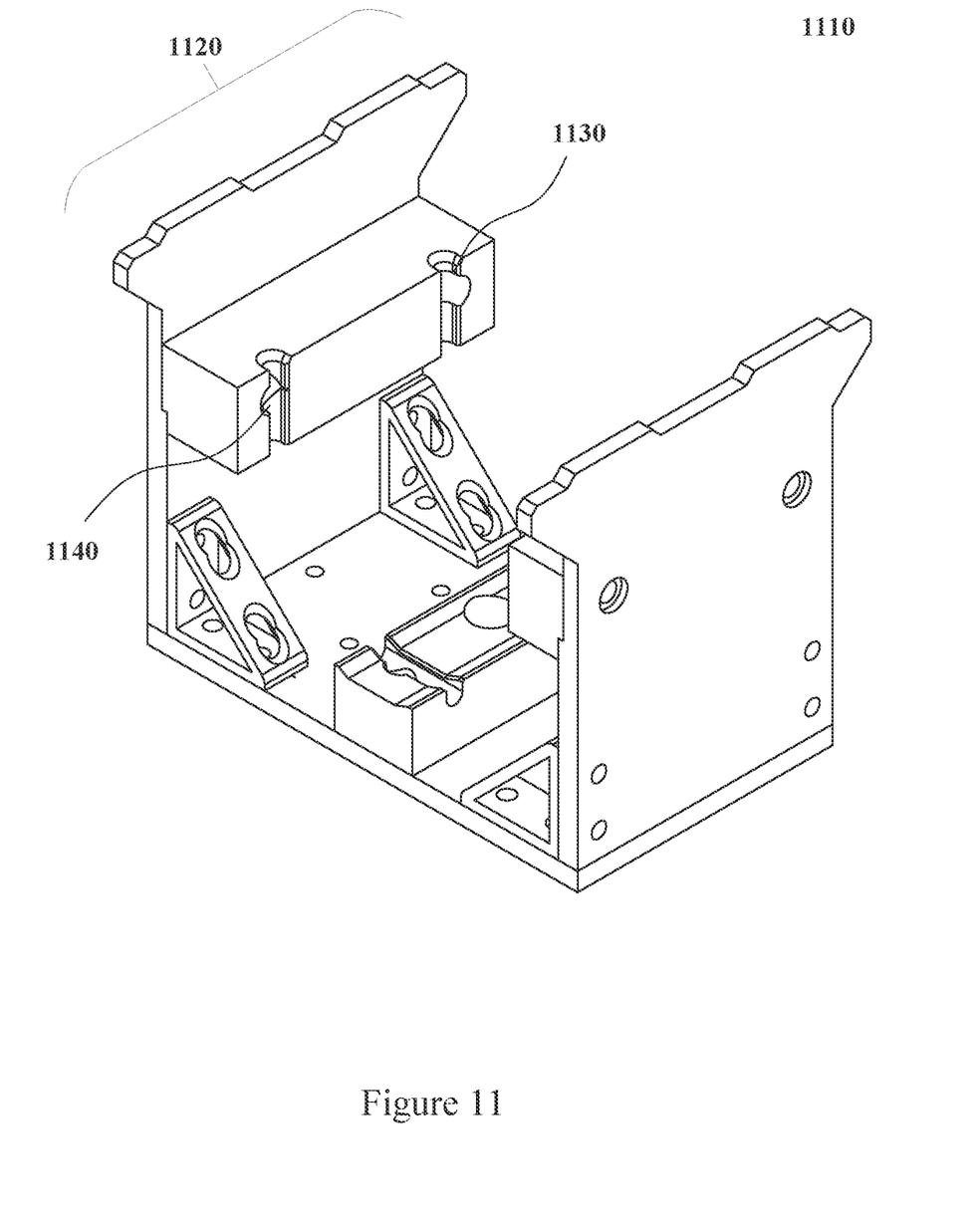
FIG. 11 is an illustration of a bracket that supports a U-bolt and module rail device comprising two U-bolts and module rails according to various embodiments of the invention.

FIG. 11 illustrates a bracket consistent that supports two U-bolt and module rail devices according to various embodiments of the invention. In this example, a first U-bolt resides in a first groove 1130 and a second U-bolt resides in a second groove 1140. The second module rails rest on a top surface 1120 comprising two raised ridges that support the two module rails such that the U-bolt and module rail device decouples from the bracket 1110 if a motor lowers the bracket 1110 or if a horizontal force above a threshold is applied to the bracket 1110 and/or U-bolt and module rail device.

FIGS. 10 and 11 illustrate additional embodiments of a U-bolt and module rail device in which a plurality of U-bolts and/or module rails are implemented. One skilled in the art will recognize that a variety of different numbers of U-bolts and module rails may be implemented within a device. Furthermore, the structure of the U-bolt and module rails may vary to facilitate coupling a torque tube to one or more solar panels.

Figure 12:
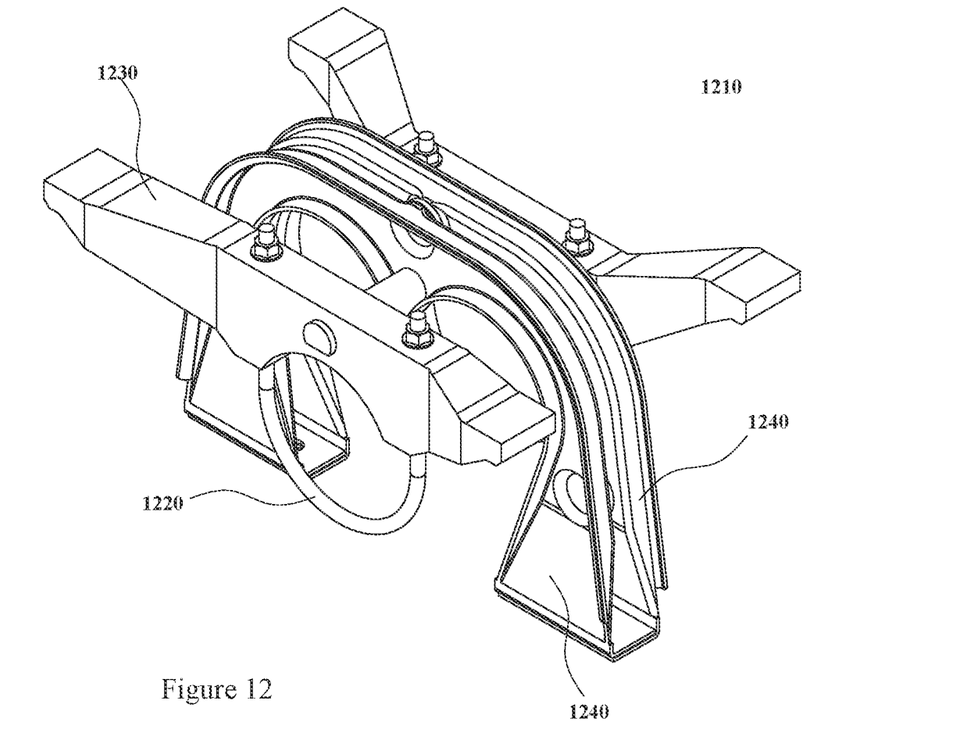
FIG. 12 is an illustration of a combination of a U-bolt and module rail device with a bearing housing bracket device according to various embodiments of the invention.

FIG. 12 further illustrates another example of a combination of a U-bolt and module rail and bearing housing bracket device according to various embodiments of the invention. In this example, the U-bolt 1220 has a slightly different shape than other examples. In various embodiments, a bearing housing bracket 1240 is positioned proximate to at least one U-bolt and module rail device. In this particular example, the bearing housing bracket is positioned between two U-bolt and module rail devices; however, a variety of combinations of bearing housing bracket(s) and U-bolt module rail device(s) may be implemented consistent with the scope of this invention. The module rail 1230 also has a different shape that previous examples. This device 1210 further evidences the numerous implementations of structures that may be implemented as a U-bolt and module rail.

One skilled in the art will recognize that the threading process(es) may be performed manually by personnel at the installation site that control each of the motors during alignment. In other embodiments, the alignment process(es) may be automatically performed by sensors and motor controls such that motor movement is controlled by computerized analysis of sensor data and/or image data. In yet other embodiments, the alignment process(es) may be performed by a combination of manual and automated steps. A variety of sensor technologies may be employed during a threading process such as LiDAR, camera sensors, radar sensors and other sensor technologies known to one of skill in the art. Furthermore, active and passive sensor systems may also be deployed.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An assembly frame system for assembling a solar table, the assembly frame system comprising:
    a torque tube;
    a plurality of guide elements that support the torque tube during a threading process, the guide elements providing aligned horizontal movement of the torque tube;
    a first motor coupled to at least one guide element within the plurality of guide elements, the first motor provides power to the at least one guide element that causes the aligned horizontal movement of the torque tube;
    a plurality of U-bolt and module rail devices, each of the plurality of U-bolt and module rail devices comprising an opening through which the torque tube is threaded;
    a plurality of brackets, each of the plurality of brackets supporting a corresponding U-bolt and module rail device at a preferred position within the assembly frame system relative to the aligned horizontal movement of the torque tube; and
    a second motor coupled to at least one of the brackets within the plurality of brackets, the second motor provides power to the at least one bracket to cause motion of the at least one bracket.

2. The assembly frame system of claim 1 wherein the at least one guide element is a roller that spins to cause the aligned horizontal movement of the torque tube.

3. The assembly frame system of claim 2 wherein the roller is a motorized roller that is powered by the first motor.

4. The assembly frame system of claim 2 wherein the roller is shaped to cause the torque tube to be centered across a surface of the roller.

5. The assembly frame system of claim 1 wherein a first bracket within the plurality of brackets comprises at least one groove that supports a U-bolt and at least one top surface that supports a module rail.

6. The assembly frame system of claim 5 wherein the at least one groove and the at least one top surface decouple from a corresponding U-bolt and module rail device in response to the second motor lowering the first bracket.

7. The assembly frame system of claim 5 wherein the at least one groove and the at least one top surface decouple from a corresponding U-bolt and module rail device in response to a horizontal force above a threshold being applied to the U-bolt and module rail device.

8. The assembly frame system of claim 1 wherein the second motor is an actuator or a four-bar linkage.

9. The assembly frame system of claim 1 wherein a first U-bolt and module rail device, within the plurality of U-bolt and module rail devices, comprises a module rail having bolt holes that facilitate the module rail to be bolted to at least one solar panel.

10. The assembly frame system of claim 1 wherein a first U-bolt and module rail device, within the plurality of U-bolt and module rail devices, has a single U-bolt and a single module rail.

11. The assembly frame system of claim 1 wherein a first U-bolt and module rail device, within the plurality of U-bolt and module rail devices, has a plurality of U-bolts and plurality of module rails.

12. The assembly frame system of claim 1 further comprising a plurality of sensors, the plurality of sensors align the torque tube to an opening within a first U-bolt and module rail device.

* * * * *